United States Patent Office 3,730,837
Patented May 1, 1973

3,730,837
PROCESS FOR PRODUCING YEAST WITH INCREASED METHIONINE CONTENT
Takashi Iguchi, Shiro Hayakawa, and Hiroshi Ohosawa, Miyazaki, Japan, assignors to Asahi Kasei Kogyo Kabushiki Kaisha, Osaka, Japan
No Drawing. Filed Sept. 8, 1971, Ser. No. 178,812
Int. Cl. C12b 1/00
U.S. Cl. 195—28 R                               7 Claims

ABSTRACT OF THE DISCLOSURE

A yeast containing a large amount of methionine is produced by aerobically culturing a hydrocarbon-assimilating yeast having resistance to ethionine and belonging to the genus Candida in a medium containing a hydrocarbon, a nitrogen source, inorganic salts and a growth-promoting compound, and then recovering the resulting yeast cell.

The hydrocarbon-assimilating yeast having resistance to ethionine includes *Candida petrophilum* NRRL Y-7338, *Candida tropicalis* NRRL Y-7339 and *Candida rugosa* NRRL Y-7340.

The thus obtained yeast contains a large amount of methionine and is preferable for use in feed and foodstuffs.

---

This invention relates to a process for producing yeasts containing a large amount of methionine by aerobically culturing a hydrocarbon-assimilating yeast having resistance to ethionine and belonging to the genus Candida in a medium containing a hydrocarbon, a nitrogen source, in organic salts and a small amount of a growth-promoting substance to accumulate methionine in the yeast cell.

An object of the invention is to provide a novel process for producing hydrocarbon-assimilating yeasts which are excellent in nutritive value when used in feed or foodstuffs.

Another object of the invention is to provide a novel process for culturing hydrocarbon-assimilating yeasts which have a large amount of methionine in the yeast cells.

Other objects and advantages of the invention will become apparent from the following description.

There are many reports concerning the production of proteins, amino acids and carboxylic acids by culturing hydrocarbon-assimilating yeasts using hydrocarbons as carbon sources.

It is generally known that among the amino acids of hydrocarbon-assimilating yeasts, the amount of methionine is particularly small. (Symposium on Microbiology, London, Sept. 19-20, 1967: The Production of Protein Biomass from Hydrocarbons.) Yeasts, which have smaller amounts of methionine than other amino acids, are necessarily inferior to the other yeast as ingredients in feeds.

The present inventors have obtained strains resistant to ethionine, which is analogous to methionine, by subjecting hydrocarbon-assimilating yeasts according to an artificial mutation treatment using, for example, ultraviolet rays or N-methyl-N-nitro-N'-nitrosoguanidine as a mutagen. The inventors have cultured these ethionine resistant strains in a medium where hydrocarbons are used as carbon sources, hydrolyzed the resulting yeasts with acid and analyzed the compositions of amino acids in the yeast cells to find that amounts of methionine in the thus obtained yeasts are much higher than those in the parent yeasts. The above-mentioned experiments were carried out in such a manner that *Candida petrophilum* ATCC 20226, *Candida tropicalis* IFO 0589, *Candida rugosa* IFO 0750 and ethionine resistant strains derived from said three parent strains were individually subjected to shaking culture at 30° C. for 30 hours in a medium which was composed of 0.1 wt./vol. percent of ammonium sulfate, 0.3 wt./vol. percent of urea, 0.15 wt./vol. percent of potassium primary phosphate, 0.05 wt./vol. percent of magnesium sulfate, 0.006 wt./vol. percent of ferrous sulfate, 0.002 wt./vol. percent of manganese sulfate, 0.002 wt./vol. percent of zinc sulfate, 0.01 wt./vol. percent of calcium chloride, 0.1 wt./vol. percent of corn steep liquor, 100γ/liter of vitamin $B_1$ and 2 vol. percent of a hydrocarbon comprising straight chain paraffin having a boiling point of 200 to 370° C., which medium had been adjusted to pH 6.0. Thereafter, the resulting cells were recovered by centrifuge, dried, decomposed with 6N-HCl at 110° C. for 24 hours and then analyzed in composition of amino acids to obtain the results set forth in Table 1.

TABLE 1.—AMOUNTS OF METHIONINE IN CELLS OF ETHIONINE RESISTANT STRAINS AND PARENT STRAINS THEREOF

| Strain | Amount of methionine in the cell |
|---|---|
| 1... *Candida petrophilum*, ATCC 20226 (Parent strain). | 0.91 g./100 g. dry cell. |
| *Candida petrophilum* No. 401 (NRRL Y-7338) (Resistant strain). | 1.28 g./100 g. dry cell. |
| 2... *Candida tropicalis* IFO 0589 (Parent strain)... | 0.98 g./100 g. dry cell. |
| *Candida tropicalis* No. 505 (NRRL Y-7339) (Resistant strain). | 1.78 g./100 g. dry cell. |
| 3... *Candida rugosa* IFO 0750 (Parent strain)... | 0.89 g./100 g. dry cell. |
| *Candida rugosa* No. 603 (NRRL Y-7340) (Resistant strain). | 1.49 g./100 g. dry cell. |

Table 1 shows that the parent strains of the genus Candida, which are hydrocarbon-assimilating yeasts, contains about 0.9% of total methionine, whereas the ethionine resistant strains contain about 1.3 to 1.8%. Heretofore, hydrocarbon-assimilating yeasts have been deficient when they are used, as protein materials for feed because of the fact that they contain a small amount of methionine and the methionine is a limiting amino acid in the amino acid index. However, this drawback can be overcome by use of said resistant strains. Further, the increase in amount of methionine due to said resistant strains is observed in the yeast cells.

The ethionine resistant strains and the parent strains were compared with each other in ethionine resistance in the following manner:

Using as a growth evaluation medium a medium composed of 2 wt./vol. percent of glucose, 0.15 wt./vol. percent of potassium primary phosphate, 0.1 wt./vol. percent of urea, 0.1 wt./vol. percent of ammonium sulfate, 0.002 wt./vol. percent of ferrous sulfate, 0.05 wt./vol. percent of magnesium sulfate, 100γ/liter of thiamine, 10γ/liter of biotin and 0 or 0.5 wt./vol. percent of ethionine, $5 \times 10^5$/ml. of each of the above mentioned parent strains and resistant strains was subjected to shaking culture at 30° C. for 24 hours to obtain the results set forth in Table 2.

TABLE 2.—COMPARISON IN ETHIONINE RESISTANCE

| Strain | Amount of ethionine (mg./ml.) | Growth degree [1] | Percent [2] |
|---|---|---|---|
| 1... Candida petrophilum ATCC 20226 (Parent strain). | 0 | 0.31 | 29 |
|  | 5 | 0.09 |  |
| Candida petrophilum No. 401 (NRRL Y-7338) (Resistant strain). | 0 | 0.30 | 70 |
|  | 5 | 0.21 |  |
| 2... Candida tropicalis IFO 0589 (Parent strain). | 0 | 0.33 | 27 |
|  | 5 | 0.09 |  |
| Candida tropicalis No. 505 (NRRL Y-7339) (Resistant strain). | 0 | 0.32 | 75 |
|  | 5 | 0.24 |  |
| 3... Candida rugosa IFO 0750 (Parent strain). | 0 | 0.29 | 28 |
|  | 5 | 0.08 |  |
| Candida rugosa No. 603 (NRRL Y-7340) (Resistant strain). | 0 | 0.28 | 82 |
|  | 5 | 0.23 |  |

[1] Growth degree was represented by the absorbance (655 m$\mu$) of the culture liquor in a cell of 1 cm. wide.
[2] Growth degree in the medium incorporated with 5 mg./ml. of ethionine/Growth degree in the medium incorporated with no ethionine ×100.

Table 2 shows that all the ethionine resistant strains are superior to the parent strains, so far as growth degree in an ethionine-incorporated medium is concerned. However, the parent strains grow somewhat in the ethionine medium. That is, it is understood that the ethionine resistant strains of the genus Candida which are used in the present invention are preferably those which show values of 60% and more according to the equation, $$\frac{\text{Growth degree in the medium incorporated with 5 mg./ml. of ethionine}}{\text{Growth degree in the medium incorporated with no ethionine}} \times 100 \text{ (percent)}$$

Typical examples of such strains include *Candida petrophilum* No. 401, *Candida tropicalis* No. 505 and *Candida rugosa* No. 603.

Isolation of *Candida petrophilum* No. 401 is conducted as follows:

Exponentially growing *Candida petrophilum* ATCC 20226 cell in medium A hereinunder defined were washed by centrifugation, resuspended in 0.1 M phosphate buffer (pH 7.0), and treated with 2 mg./ml. of N-methyl-N-nitro-N'-nitrosoguanidine at 30° C. for 30 min. The cells were then washed and inoculated on a solid medium A supplemented with 0.5% ethionine.

After incubation for 3-4 days, colonies that appeared were replicated onto medium B hereinunder defined on which methionine auxotroph (*E. coli* 215) had been previously spread over, and incubated for 1-2 days at 30° C., and halo-former was picked up (No. 401).

Medium:
```
Glucose _____ 2% (wt./vol.).
KH2PO4 _____ 0.15%.
(NH3)2CO _____ 0.1%.
(NH4)2SO4 _____ 0.1%.
MgSO4·7H2O _____ 0.05%.
Vitamin B1 _____ 100γ/l.
Agar _____ 2%.
H2O _____ The balance.
```

Medium B:
```
Glucose _____ 2% (wt./vol.).
KH2PO4 _____ 0.7%.
K2HPO4 _____ 0.3%.
Na3-citrate _____ 0.05%.
(NH4)2SO4 _____ 0.1%.
MgSO4·7H2O _____ 0.05%.
Vitamin B1 _____ 100 γ/l.
Agar _____ 2%.
H2O _____ The balance.
```

As to the other two strains, the same procedure as above is applied to the parent strains, i.e. *Candida tropicalis* IFO 0589 and *Candida rugosa* IFO 0750, respectively.

These strains thus obtained are deposited respectively with the United State Department of Agriculture, Northern Regional Research Laboratory at Peoria, Ill., U.S.A., and have been given the numbers NRRL Y-7338, NRRL Y-7339 and NRRL Y-7340, respectievly. Samples of these microorganisms can be obtained from the aforesaid Research Laboratory. (The deposit was made with the aforesaid Research Laboratory with all restrictions on the availability to the public being irrevocably removed upon the granting of the patent.)

In the present invention, the ethionine resistant yeasts of the genus Candida can be cultured according to any of the known culture processes. The culture medium used in the present invention contains a hydrocarbon, a nitrogen source, inorganic salts and, in some cases, a growth-promoting substance. As the hydrocarbon, a straight chain hydrocarbon, preferably n-paraffin having a boiling point of 200° to 370° C., may be used. The nitrogen source may be any of those which are ordinarily used in this field such as, for example, ammonia, ammonium chloride, ammonium sulfate, ammonium nitrate, ammonium carbonate, ammonium acetate and urea. As the inorganic salts, any of potassium secondary hydrogen phosphate, potassium primary hydrogen phosphate, phosphoric acid, potassium chloride, magnesium sulfate, sodium chloride, ferrous sulfate, manganese sulfate and zinc sulfate may be used according to the kind of the strain used. When an organic nutrient source such as yeast extract, corn steep liquor, casein hydrolyzate, vitamin $B_1$ or biotin is used as the growth-promoting substance, the growth of the strain is advantageously promoted.

In the thus prepared medium, the ethionine resistant strain is aerobically cultured. In this case, the pH of the aqueous medium and the culture temperature are varied depending on the kind of the strain used. Ordinarily, however, a pH of 3 to 6 and a temperature of 25° to 35° C. are preferable.

The present invention is illustrated in further detail below with reference to examples, but the scope of the invention is not limited to these examples.

EXAMPLE 1

10 liters of a medium comprising, per 100 ml., 0.1 g. of ammonium sulfate, 0.3 g. of urea, 0.15 g. of potassium primary phosphate, 0.05 g. of magnesium sulfate, 0.006 g. of ferrous sulfate, 0.004 g. of manganese sulfate, 0.01 g. of calcium chloride, 0.01 g. of zinc sulfate, 0.2 g. of corn steep liquor and 2 vol. percent of a straight chain paraffin having a boiling point of 200 to 370° C. which medium had been adjusted to pH 6.0, were fed to a 20 liter-jar fermentor. Subsequently, *Candida petrophilum* No. 401 (NRRL Y-7338) was inoculated into the medium and cultured for 15 hours under conditions of 700 r.p.m., an aeration rate of 1 liter/liter/min. and a temperature of 30° C. Thereafter, the cell was recovered by centrifuge, dried, decomposed with 6N-HCl at 110° C. for 24 hours according to an ordinary procedure and then analyzed by means of an amino acid analyzer. The amount of methionine in the cell as 1.32%.

On the other hand, the parent strain *Candida petrophilum* ATCC 20226 was cultured and analyzed in the same manner as above. In this case, the amount of methionine in the cell was 0.92%.

EXAMPLE 2

10 liters of a medium comprising, per 100 ml., 0.1 g. of ammonium sulfate, 0.1 g. of phosphoric acid, 0.05 g. of potassium chloride, 0.05 g. of magnesium sulfate, 0.002 g. of ferrous sulfate, 0.002 g. of manganese sulfate, 0.2 g. of corn steep liquor and 2 ml. of a straight chain paraffin having a boiling point of 200 to 370° C. were fed to a 20 liter-jar fermentor. Subsequently, *Candida tropicalis* No. 505 (NRRL Y-7339) and *Candida tropicalis* IFO 0589 were individually inoculated into the medium and cultured for 18 hours under conditions of 700 r.p.m., an aeration rate of 1 liter/liter/min. and a temperature of 30° C. During the culture, the medium was adjusted to pH 3.0 to 6.0 by addition of ammonia water. After completion of the culture, the cells were analyzed in the same manner as in Example 1. The amounts of methionine in the cells of *Candida tropicalis* No. 505 (NRRL Y–7339) and the parent strain IFO 0589 were 1.96% and 0.99%, respectively.

EXAMPLE 3

*Candida rugosa* No. 603 (NRRL Y–7340) and the parent strain IFO 0750 were cultured in entirely the same manner as in Example 2, and the resulting yeast cells were analyzed in the same manner as in Example 1. The amounts of methionine in the cells were 1.58% and 0.87%, respectively.

We claim:

1. A process for producing a yeast containing a large amount of methionine which comprises aerobically culturing a hydrocarbon-assimilating yeast having resistance to ethionine and belonging to the genus Candida in a medium containing a hydrocarbon, a nitrogen source, inorganic salts and a growth-promoting compound, and then recovering the resulting yeast cell.

2. A process according to claim 1, wherein the ethionine resistant yeast is such that the growth degree thereof when cultured for 24 hours in a medium containing 5 mg./ml. of ethionine is at least 60% of the growth degree thereof when cultured for 24 hours in a medium containing no ethionine.

3. A process according to claim 1, wherein the ethionine resistant yeast is *Candida petrophilum* NRRL Y–7338.

4. A process according to claim 1, wherein the ethionine resistant yeast is *Candida tropicalis* NRRL Y–7339.

5. A process according to claim 1, wherein the ethionine resistant yeast is *Candida rugosas* NRRL Y–7340.

6. A process according to claim 1, wherein the hydrocarbon is n-paraffin having a boiling point of 200° to 370° C.

7. A process according to claim 1, wherein the pH of the medium is 3 to 6, and the culture temperature is 25° to 35° C.

References Cited

UNITED STATES PATENTS 3,674,640    7/1972    Takeda et al. _____ 195—28 R

OTHER REFERENCES

Metzenberg et al.: Irreparable Mutations and Ethionine Resistance in Neurospora Science, vol 145, pp. 1434–1435. (1964).

Otsuka et al.: Utilization of Hydrocarbons as Carbon Sources in Production of Yeast Cells, J. Gen. App. Microbiol., vol. 12, pp. 1–11 (1966).

LIONEL M. SHAPIRO, Primary Examiner

R. B. PENLAND, Assistant Examiner

U.S. Cl. X.R.

99—96